F. A. WASSON.
TROLLEY RETRIEVER VALVE.
APPLICATION FILED MAY 12, 1913.
1,187,116.
Patented June 13, 1916.
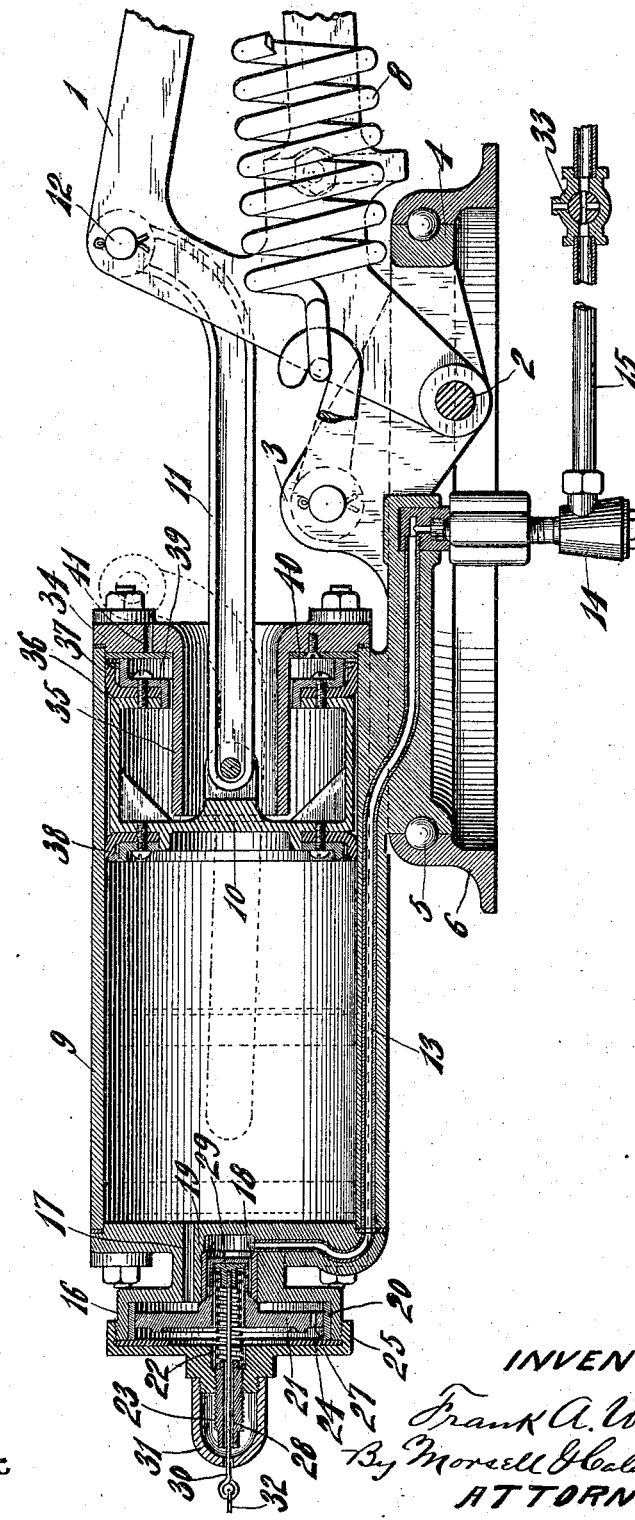
WITNESSES
INVENTOR
Frank A. Wasson
By Morsell & Caldwell
ATTORNEYS

UNITED STATES PATENT OFFICE.

FRANK A. WASSON, OF MILWAUKEE, WISCONSIN.

TROLLEY-RETRIEVER VALVE.

1,187,116.  Specification of Letters Patent.  Patented June 13, 1916.

Application filed May 12, 1913. Serial No. 767,016.

*To all whom it may concern:*

Be it known that I, FRANK A. WASSON, a citizen of the United States and resident of Milwaukee, in the county of Milwaukee and State of Wisconsin, have invented new and useful Improvements in Trolley-Retriever Valves, of which the following is a description, reference being had to the accompanying drawings, which are a part of this specification.

This invention has for its object to provide means for automatically lowering an electric railway trolley to a position where it will produce no injury to the overhead structure in the event of the trolley leaving the trolley wire. It is necessary that the trolley wheel be held firmly against the trolley wire in order to maintain a proper electrical connection therewith and that the trolley be permitted to have a swinging movement in order that it may maintain such connection notwithstanding the variation in the elevation of the trolley due to its distant points of suspension. When the trolley leaves the wire it swings upwardly with force and unless immediately retracted is liable to cause damage to the overhead structure or receive injury therefrom.

The present invention is designed to utilize compressed air from the usual air brake system or from any other source for automatically retracting the trolley when it makes a sudden upward movement on leaving the wire, without interfering with the slower swinging movements of the trolley in maintaining its connection with the wire.

More particularly the present invention relates to the construction of the automatic valve in a trolley retriever of the type shown and described in my co-pending application for Letters Patent Serial No. 732,638, filed November 21, 1912, which resulted in Patent No. 1,143,002, dated June 15, 1915.

This present invention consists of the automatic valve construction for controlling the supply of compressed air to the trolley swinging motor so as to admit the compressed air to the motor upon the occurrence of the sudden upward movement of the trolley on leaving the wire and for preventing the escape of pressure fluid at other times and for permitting of a hand control of the valve when it is desired to retract the trolley at other times.

With the above and other objects in view the invention consists in the trolley retrieving valve as herein claimed and all equivalents.

In the accompanying drawings which represent a sectional elevation of a trolley retriever constructed in accordance with this invention; 1 indicates the trolley frame which is pivotally mounted at 2 within a slot of a rotatable base 4 and between a pair of upstanding brackets 3, only one of which is shown. The base 4 has a ball bearing connection 5 within a ring 6 adapted to be fastened to the roof of the car. Coil springs 8 connect the upper ends, not shown, of the trolley frame 1 with the upper ends of brackets 3 for holding the trolley in its engagement with the wire.

A cylinder 9 is mounted on the trolley base 4 and contains a piston 10 with its connecting rod 11 connecting with a stud 12 on the frame 1 at some distance above the pivotal connection 2. The swinging movements of the trolley on the pivotal connection 2 cause reciprocating movements of the piston within the cylinder. A passageway 13 leads from swivel pipe connection 14 at the center of the trolley base 4 which is supplied with compressed air from the compressed air reservoir of the air brake system or other supply by pipe 15. The passageway 13 at the end of the cylinder continues through the cylinder head to the center thereof where it communicates with the interior of a valve casing 16 of an automatic valve, which valve casing is preferably formed integral with the cylinder head. This casing forms coaxial cylindrical chambers of different diameters, the inner chamber being the smaller and having direct communication with the passageway 13 and the outer chamber having communication with the interior of the cylinder through a passageway 17. A bushing 18 forming a tapering valve seat at its end is fitted within the smaller chamber of the valve casing against a shoulder 19 and a bushing 20 forms a lining for the larger chamber of the valve casing. A valve member 21 fits within the bushing 20 at one end which is of larger diameter and its other end of smaller diameter freely passes through the bushing 18, while its conical intermediate portion fits upon the valve seat of bushing 18 to close the passageway through the valve casing. The valve is held in its seated position by the pressure of a spring 22 contained therein and engaged at its outer end by a set screw 23. A gasket 24 secured between the edge of a screw cap 25 and the edge of the valve casing on which it is threaded forms a seat for an annular flange on the outer face of the larger end of the valve member to prevent the leakage of air past the valve when the valve is in its outer or open position.

The pressure of spring 22 under the adjustment of the set screw 23 is such that the pressure conveyed to the inner end of the valve casing from the compressed air reservoir through passageway 13 is insufficient to move the valve off of its conical seat, and consequently atmospheric pressure only is contained within the cylinder. The slight variations in pressure due to the slow reciprocating movements of the piston from the ordinary changes in elevation of the trolley wire are insufficient to produce a change in position of the automatic valve, for the automatic valve is provided with a leakway consisting of a small opening 27 therethrough and the set screw 23 has a central opening 28. The vent or breathing passage for the cylinder is therefore through passageway 17, opening 27 in the valve and opening 28 in the set screw. When, however, the piston is given a quick movement in the cylinder due to the trolley leaving the wire and moving upward, these breathing passageways are insufficient to relieve the pressure in the cylinder incident thereto and such pressure acting upon the inner face of the larger portion of the valve member is sufficient with the assistance of pressure of air from the pressure reservoir against the smaller portion of the valve to move the valve and hold it tightly against its gasket 24, preventing leakage of pressure thereby. This opening of the valve, however, admits the high pressure air from the compressed air reservoir to the cylinder through passageway 17 and its action upon the piston 10 is to immediately lower the trolley to the position shown.

The spring 22 does not bear directly against the valve member, but bears against a flanged head 29 of a rod 30 which passes out through the opening 28 of the set screw 23 and also through an opening in a protecting cap 31 threaded on the screw cap 25 and surrounding the set screw and this rod 30 has a wire or other suitable connection 32 extending to a position within convenient reach of the motorman so that when he desires to withdraw the trolley in order to pass construction work or for any other reason it is only necessary for him to pull on said connection and thus remove the pressure of spring 22 from the valve member 21, permitting the pressure of compressed air against the smaller end of the valve member to move the valve member to its open position and thus cause the trolley to be withdrawn under the pressure of air in the cylinder.

In order that the trolley may be released from its lower position in which it is forced and held by the compressed air in the cylinder, a three-way cock 33 is provided in the compressed air supply pipe 15 and by means thereof the supply of compressed air to the automatic valve may be shut off and the valve casing opened to the atmosphere. This permits of the exhaust of the compressed air in the valve casing and the cylinder, permitting the spring 8 to restore the trolley to its normal condition and permitting the spring 22 to return the automatic valve to its seated position. After the automatic valve is seated the three-way cock 33 is returned to its normal position as shown and the device is again ready for operation.

The open end of the cylinder is provided with a ring 34 and with an annular flange 35 or tube extending within the cylinder to loosely fit a flanged extension 36 of the piston and forming between it and the wall of the cylinder a pocket or dashpot to cushion the outward movement of the piston and prevent the trolley being thrown with force against the car roof. A cup-shaped leather gasket 37 is provided at the extension 35 of the piston similar to the leather gasket 38 around the piston proper and the piston travels on these two varying surfaces without having metallic bearing surface against the cylinder. The gasket 37 is held in place by means of a flanged ring 39 with an inner flange extending in one direction and an outer flange extending in the opposite direction. The inner flange of this ring 39 forms the loose fit for the piston extension 36 around the tube 35 while the outer flange thereof is adapted in the outer position of the piston to bear against a leather or other suitable gasket 40 secured to the inner face of ring 34 and which forms a flap valve for an opening 41 through said ring to freely admit air to the space between the ring and the piston extension during the inner movement of the piston. During the outer movement of the piston under the action of the compressed air in the cylinder the flap valve remains closed and the space between the piston extension and the ring 29 forms a dashpot to cushion the end of the stroke of the piston. The flange of ring 39 which bears against gasket 40 assists the gasket 38 of the piston in preventing the leakage of compressed air during the time the trolley is held in its lower position by the compressed air in the cylinder.

By means of this invention the trolley is quickly withdrawn through automatic means actuated by the quick upward movement of the trolley when it leaves the wire and its downward movement while forcible is sufficiently cushioned to prevent its doing injury to the car. While the device is operated by compressed air there is no waste of air pressure, for the pressure from the reservoir is only admitted to the cylinder when the trolley leaves the wire and is then confined against leakage.

While the invention has been described as pertaining to a trolley retriever it is obvious that the valve construction may be capable of other uses and the claims are therefore not to be understood as restricted to this particular use for the valve.

What I claim as new and desire to secure by Letters Patent is:

1. In a trolley retriever, an automatic valve comprising a casing, a spring pressed valve member seated therein and provided with separate pressure areas on opposite sides of the seat thereof both tending to unseat the valve, a compressed air supply means having communication with one pressure area of the valve member, a trolley swinging member having communication with the other pressure area of the valve member, and means for relieving the valve of the spring pressure for permitting hand control of the retrieving means.

2. In a trolley retriever, a cylinder, a piston working therein and adapted for connection with a trolley, a valve casing on the end of the cylinder provided with a valve seat, a valve member fitting within the valve casing and seated on the valve seat, said valve member having its end of larger diameter than the valve seat and fitting in a correspondingly larger portion of the valve casing, there being a passageway between the larger portion of the valve casing and the cylinder, means for supplying compressed air communicating with the valve at the smaller portion thereof, both valve areas of the valve member tending to unseat the valve, a cap member fitting on the valve casing, a set screw threaded in the cap member and provided with an opening therethrough, a spring bearing against the set screw and against the valve to hold the valve normally seated, and a stem connected with the end of the spring which bears against the valve and passing through the opening in the set screw by means of which the valve may be relieved of the pressure of the spring.

3. In a trolley retriever, an automatic valve, comprising a casing having a cylindrical portion with a concentric compressed air passageway leading thereto and of smaller diameter and terminating in a valve seat, a valve member fitting within the cylindrical portion of the valve casing and provided with a valve seated on the valve seat and subjected to the pressure of the compressed air passageway, a spring holding the valve against its seat, a trolley swinging means having communication with the cylindrical portion of the valve casing, and a hand operated means for relieving the valve of the spring pressure.

In testimony whereof, I affix my signature, in presence of two witnesses.

FRANK A. WASSON.

Witnesses:
R. S. C. CALDWELL,
KATHERINE HOLT.

Copies of this patent may be obtained for five cents each, by addressing the "Commissioner of Patents, Washington. D. C."